US010894473B2

(12) United States Patent
Taikou et al.

(10) Patent No.: US 10,894,473 B2
(45) Date of Patent: Jan. 19, 2021

(54) IN-WHEEL MOTOR DRIVE DEVICE

(71) Applicant: NTN CORPORATION, Osaka (JP)

(72) Inventors: Shinya Taikou, Shizuoka (JP); Shiro Tamura, Shizuoka (JP); Tomohisa Uozumi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/340,211

(22) PCT Filed: Nov. 24, 2016

(86) PCT No.: PCT/JP2016/084711
§ 371 (c)(1),
(2) Date: Apr. 8, 2019

(87) PCT Pub. No.: WO2018/073979
PCT Pub. Date: Apr. 26, 2018

(65) Prior Publication Data
US 2020/0039344 A1 Feb. 6, 2020

(30) Foreign Application Priority Data

Oct. 19, 2016 (JP) ................. 2016-205139

(51) Int. Cl.
*B60K 7/00* (2006.01)
*F16H 1/06* (2006.01)
(Continued)

(52) U.S. Cl.
CPC ............. *B60K 7/0007* (2013.01); *F16H 1/06* (2013.01); *F16H 1/20* (2013.01); *B60G 2204/14* (2013.01);
(Continued)

(58) Field of Classification Search
CPC .................................................... B60K 7/0007
See application file for complete search history.

(56) References Cited

U.S. PATENT DOCUMENTS 5,691,584 A      11/1997   Toida et al.
2008/0023291 A1*  1/2008   Sorani .................. F02B 61/045
                                              192/48.614
(Continued)

FOREIGN PATENT DOCUMENTS

EP    3 527 413    8/2019
JP    7-81436      3/1995
(Continued)

OTHER PUBLICATIONS

International Search Report dated Feb. 7, 2017 in International (PCT) Application No. PCT/JP2016/084711.
(Continued)

*Primary Examiner* — Erez Gurari
(74) *Attorney, Agent, or Firm* — Wenderoth, Lind & Ponack, L.L.P.

(57) ABSTRACT

Provided is an in-wheel motor drive device (21) including: a motor (28); a wheel bearing (53); and a speed reducer (38). The speed reducer (38) comprises: a speed reducer input shaft ($S_{in}$) including an input gear (34); a speed reducer output shaft ($S_{out}$) including an output gear (37); and an intermediate shaft ($S_m$) including a small-diameter intermediate gear (36) and a large-diameter intermediate gear (35). The large-diameter intermediate gear (35) has a circumscribed circle which is superimposed with a pitch circle of a plurality of rolling elements (42) of the wheel bearing (53) when viewed from an axial direction.

8 Claims, 5 Drawing Sheets

(51) Int. Cl.
*F16H 1/20* (2006.01)
*F16H 57/021* (2012.01)
*F16H 57/03* (2012.01)

(52) U.S. Cl.
CPC ...... *B60G 2204/182* (2013.01); *F16H 57/021* (2013.01); *F16H 57/03* (2013.01)

(56) References Cited

U.S. PATENT DOCUMENTS

| 2013/0009450 | A1* | 1/2013 | Suzuki | B60K 7/0007 |
| | | | | 301/6.5 |
| 2013/0276567 | A1* | 10/2013 | Odajima | F16H 57/043 |
| | | | | 74/421 A |
| 2013/0284528 | A1* | 10/2013 | Kawasaki | B60K 7/0007 |
| | | | | 180/60 |
| 2014/0256493 | A1* | 9/2014 | Knoblauch | B60K 7/0007 |
| | | | | 475/151 |
| 2015/0158381 | A1* | 6/2015 | Shin | B60K 17/046 |
| | | | | 475/149 |
| 2018/0118022 | A1* | 5/2018 | Shin | B60B 27/0052 |
| 2018/0294692 | A1* | 10/2018 | Sato | H02K 9/19 |
| 2020/0044513 | A1 | 2/2020 | Taikou et al. | |

FOREIGN PATENT DOCUMENTS

| JP | 2013-209016 | 10/2013 |
| JP | 2014-046742 | 3/2014 |
| JP | 2016-181954 | 10/2016 |

OTHER PUBLICATIONS

International Preliminary Report on Patentability and Written Opinion of the International Searching Authority dated Feb. 7, 2017 in International (PCT) Application No. PCT/JP2016/084711.
Extended European Search Report dated May 19, 2020 in corresponding European Patent Application No. 16919468.5.

\* cited by examiner

IN-WHEEL MOTOR DRIVE DEVICE

TECHNICAL FIELD

The present invention relates to an in-wheel motor drive device, in which a rotation shaft of a motor and a wheel bearing are coupled to each other through intermediation of a speed reducer.

BACKGROUND ART

In an in-wheel motor drive device, a speed reducer is used for downsizing of a motor, thereby being capable of achieving downsizing and reduction in weight of the in-wheel motor drive device as a whole and reduction in unsprung weight. This is because of the following reason. Output torque of the motor is proportional to a size and a weight of the motor. Thus, in order to generate torque which is required for drive of a vehicle solely by a motor, a motor having a large size is required. However, the weight and volume of the motor which are reduced through use of the speed reducer exceed those of the speed reducer.

For example, in Patent Literature 1 described below, there is disclosed an in-wheel motor drive device including a two-shaft one-stage parallel shaft gear speed reducer. This speed reducer includes an input gear and an output gear. The input gear rotates integrally with a rotation shaft of a motor. The output gear meshes with the input gear and rotates integrally with a rotation ring of a wheel bearing.

Moreover, in Patent Literature 2 described below, there is disclosed an in-wheel motor drive device including a three-shaft two-stage parallel shaft gear speed reducer. This speed reducer includes an intermediate shaft. The intermediate shaft is arranged between an input gear and an output gear, and includes a first counter gear and a second counter gear. The input gear and the first counter gear form a gear train on an input side, and the output gear and the second counter gear form a gear train on an output side. Rotation of the motor is reduced in speed through intermediation of those gear trains in two stages.

CITATION LIST

Patent Literature 1: JP 2013-209016 A
Patent Literature 2: JP 2014-46742 A

SUMMARY OF INVENTION

Technical Problem

In the two-shaft one-stage parallel shaft gear speed reducer disclosed in Patent Literature 1 described above, in order to increase a speed reduction ratio thereof, it is required that a pitch circle diameter of the output gear be set larger than a pitch circle diameter of the input gear. When the pitch circle diameter of the output gear is set larger as described above, the input gear meshing with the output gear is arranged with large offset with respect to a wheel center. As a result, a stator portion of the motor arranged coaxially with the input gear protrudes on a radially outer side with respect to a space on an inner periphery of the wheel (hereinafter referred to as "wheel inner space"), and there is a fear in that the in-wheel motor drive device interferes with a vehicle body or suspension parts. Moreover, a lower arm ball joint configured to mount the in-wheel motor drive device to the vehicle body is generally mounted to a lower part of the in-wheel motor drive device. However, when the output gear becomes larger, a housing configured to accommodate the speed reducer also becomes larger. Therefore, a space below the housing becomes narrower, with the result that it becomes more difficult to provide a mounting point for the lower arm ball joint.

As a result, in order to avoid interference of the in-wheel motor drive device with the vehicle body or the suspension parts, the motor cannot be increased in size, and hence there is a fear in that motive power becomes insufficient. Moreover, in order to avoid the interference described above, limitation is added to the shapes of the suspension parts. As a result, there is a fear in that defects such as increase in weight and degradation in strength of the suspension parts or decrease in minimum ground clearance occur. Further, in order to avoid the interference described above, design change on the vehicle body side may be required. As a result, there is a fear in that the motion performance of the vehicle is degraded or standardization of the vehicle body is hindered.

Meanwhile, in the three-shaft two-stage parallel shaft gear speed reducer disclosed in Patent Literature 2 described above, the counter gear is interposed between the input gear and the output gear, thereby being capable of increasing the speed reduction ratio while suppressing the pitch circle diameter of the output gear. However, in some cases, there is a difficulty in sufficiently suppressing the pitch circle diameter of the output gear while achieving a high speed reduction ratio by simply increasing the number of gear trains of the parallel shaft gear speed reducer.

Therefore, the present invention has an object to prevent interference of an in-wheel motor drive device with a vehicle body or suspension parts by compactizing the in-wheel motor drive device through sufficient suppression of a pitch circle diameter of an output gear while achieving a high speed reduction ratio.

Solution to Problem

According to one embodiment of the present invention, which has been devised to achieve the above-mentioned object, there is provided an in-wheel motor drive device, comprising: a motor; a wheel bearing comprising a fixed ring, a rotation ring, and a plurality of rolling elements arranged between the fixed ring and the rotation ring; and a speed reducer configured to connect the motor and the wheel bearing to each other, the speed reducer being formed of a parallel shaft gear speed reducer comprising: a speed reducer input shaft, which is configured to rotate integrally with a rotation shaft of the motor, and comprises an input gear; a speed reducer output shaft, which is configured to rotate integrally with the rotation ring of the wheel bearing, and comprises an output gear; and an intermediate shaft comprising: a small-diameter intermediate gear configured to mesh with the output gear; and a large-diameter intermediate gear provided coaxially with the small-diameter intermediate gear, wherein the large-diameter intermediate gear has a circumscribed circle which is superimposed with a pitch circle of the plurality of rolling elements of the wheel bearing when viewed from an axial direction.

Through the interposition of the intermediate gear between the input gear and the output gear as described above, a pitch circle diameter of the output gear can be suppressed while maintaining a large speed reduction ratio. Therefore, an amount of offset of the motor with respect to a wheel center is suppressed, thereby being capable of reducing the size of the in-wheel motor drive device in a direction orthogonal to the axial direction. Further, according to the present invention, the circumscribed circle of the large-diameter intermediate gear is increased in diameter to such an extent that the circumscribed circle is superimposed with the pitch circle of the plurality of rolling elements of the wheel bearing, when viewed in the axial direction. With this, a speed reduction ratio of a gear train comprising the large-diameter intermediate gear increases, thereby being capable of further suppressing the pitch circle diameter of the output gear while maintaining the large speed reduction ratio of the speed reducer as a whole.

It is preferred that the speed reducer comprise gear trains each formed of gears in mesh with each other and the gear trains each have a speed reduction ratio of equal to or larger than 2.5 and equal to or smaller than 7. When the speed reduction ratio of any one of the gear trains is less than 2.5, a desired speed reduction ratio cannot be achieved, or a pitch circle diameter of a driven gear of another gear train becomes excessively larger. Moreover, when the speed reduction ratio of any one of the gear trains exceeds 7, an undercut is liable to occur in a gear of the gear train on a pinion side, and there arises a problem such as degradation in strength of the gear or vibrations caused thereby.

In the in-wheel motor drive device described above, when the large-diameter intermediate gear has a pitch circle diameter which is smaller than a pitch circle diameter of the output gear, the interference between the large-diameter intermediate gear and the speed reducer output shaft can be more easily avoided.

In the in-wheel motor drive device described above, it is preferred that the speed reducer input shaft and the speed reducer output shaft be arranged close to each other. For example, when the speed reducer is formed of a three-shaft two-stage parallel shaft gear speed reducer comprising the large-diameter intermediate gear and the input gear in mesh with each other, it is preferred that an angle formed between a line connecting a center of the speed reducer input shaft and a center of the intermediate shaft and a line connecting a center of the speed reducer output shaft and the center of the intermediate shaft be equal to or smaller than 90°. With this, an amount of offset of the speed reducer input shaft with respect to the speed reducer output shaft, that is, the amount of offset of the motor with respect to the wheel center is suppressed, thereby being capable of more easily accommodating the motor in a radial region of a wheel inner space.

The wheel bearing may be, for example, a wheel bearing of an inner-ring rotation type.

Advantageous Effects of Invention

As described above, according to the in-wheel motor drive device of the present invention, the in-wheel motor drive device can be compactized through sufficient suppression of the pitch circle diameter of the output gear while achieving the high speed reduction ratio. Therefore, interference of the in-wheel motor drive device with the vehicle body or suspension parts can be prevented.

DESCRIPTION OF EMBODIMENTS

An in-wheel motor drive device according to one embodiment of the present invention is described in detail with reference to the drawings.

Figure 5:
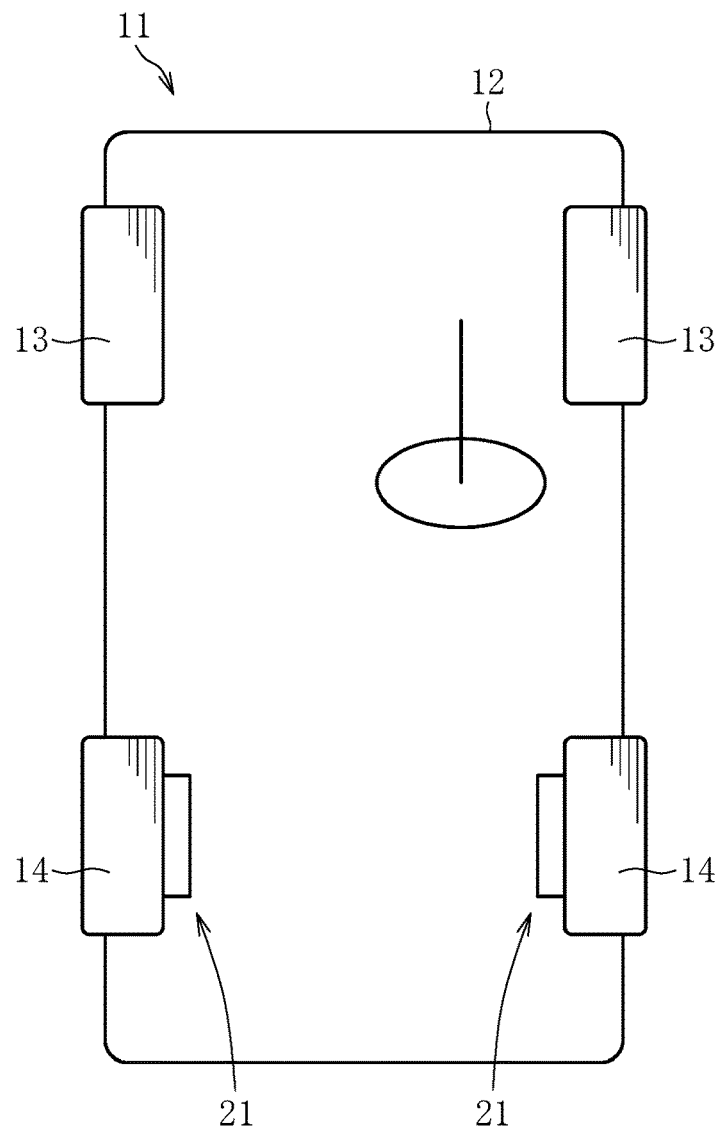
FIG. 5 is a plan view for illustrating a schematic configuration of an electric vehicle on which in-wheel motor drive devices are mounted.
Figure 6:
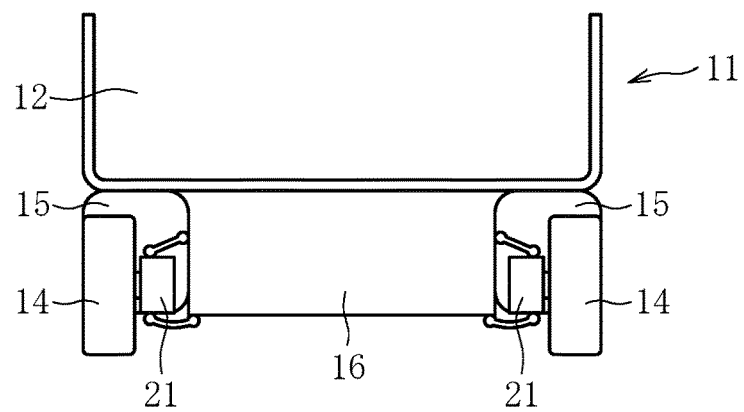
FIG. 6 is a rear sectional view of the electric vehicle of FIG. 5.

As illustrated in FIG. 5, an electric vehicle 11 comprises a chassis 12, front wheels 13 serving as steered wheels, rear wheels 14 serving as driving wheels, and in-wheel motor drive devices 21 configured to transmit driving force to the rear wheels 14. As illustrated in FIG. 6, each rear wheel 14 and each in-wheel motor drive device 21 are accommodated inside a wheel housing 15 of the chassis 12 and fixed below the chassis 12 via a suspension device (suspension) 16.

In the suspension device 16, horizontally extending suspension arms are configured to support the rear wheels 14, and a strut comprising a coil spring and a shock absorber is configured to absorb vibrations that each rear wheel 14 receives from the ground to suppress the vibrations of the chassis 12. In addition, a stabilizer configured to suppress tilting of a vehicle body during turning and other operations is provided at connecting portions of the right and left suspension arms. In order to improve a property of following irregularities of a road surface to transmit the driving force of the rear wheels 14 to the road surface efficiently, the suspension device 16 is an independent suspension type capable of independently moving the right and left wheels up and down.

The electric vehicle 11 does not need to comprise a motor, a drive shaft, a differential gear mechanism, and other components on the chassis 12 because the in-wheel motor drive devices 21 configured to drive the right and left rear wheels 14, respectively, are arranged inside the wheel housings 15. Accordingly, the electric vehicle 11 has advantages in that a large passenger compartment space can be provided and that rotation of the right and left rear wheels 14 can be controlled, respectively.

Figure 1:
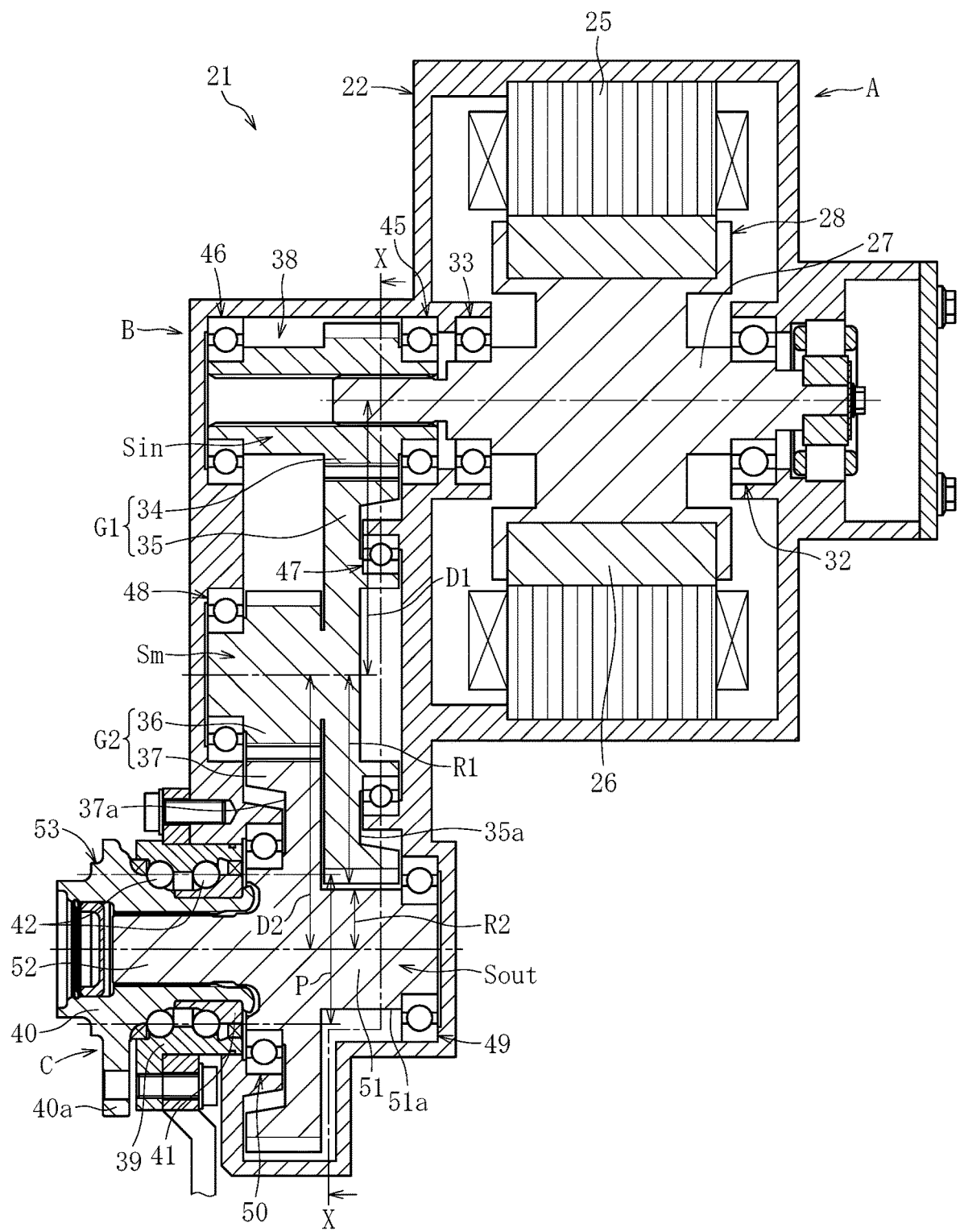
FIG. 1 is a sectional view of an in-wheel motor drive device according to one embodiment of the present invention, and is a sectional view taken along a line passing through Y-O2-Y of FIG. 2.

Prior to the description of a characteristic configuration of this embodiment, an overall configuration of the in-wheel motor drive device 21 is described with reference to FIG. 1. In the following description, under a state in which the in-wheel motor drive device 21 is mounted to the vehicle body, a side closer to an outer side of the vehicle body is referred to as "out-board side" (left side in FIG. 1), and a side closer to a center of the vehicle body is referred to as "in-board side" (right side in FIG. 1).

The in-wheel motor drive device 21 comprises a drive section A configured to generate driving force, a speed reduction section B configured to reduce a speed of rotation of the drive section A to output the rotation, and a bearing section C configured to transmit the output from the speed reduction section B to the wheels serving as driving wheels. The drive section A, the speed reduction section B, and the bearing section C are accommodated in a housing 22. The housing 22 may have a unified structure as illustrated in FIG. 1, or may have a dividable structure.

The drive section A is a radial gap type electric motor 28 comprising a stator 25 fixed to the housing 22, a rotor 26 arranged on a radially inner side of the stator 25 at an opposed position with a gap, and a motor rotation shaft 27, which is arranged on a radially inner side of the rotor 26 so as to rotate integrally with the rotor 26. The motor rotation shaft 27 is rotatable at high speed of ten thousand rotations or more per minute. The stator 25 is formed by winding a coil around an outer periphery of a magnetic core, and the rotor 26 is formed of a magnetic body such as a permanent magnet. The motor rotation shaft 27 is supported at its in-board-side end portion by a rolling bearing 32 and at its out-board-side end portion by a rolling bearing 33 so as to be freely rotatable with respect to the housing 22.

The speed reduction section B is formed of a three-shaft two-stage parallel shaft gear speed reducer 38 comprising a speed reducer input shaft $S_{in}$, an intermediate shaft $S_m$, and a speed reducer output shaft $S_{out}$. The speed reducer input shaft $S_{in}$ integrally comprises an input gear 34. The intermediate shaft $S_m$ integrally comprises a large-diameter intermediate gear 35 and a small-diameter intermediate gear 36. The speed reducer output shaft $S_{out}$ integrally comprises an output gear 37. The large-diameter intermediate gear and the small-diameter intermediate gear 36 are provided integrally and coaxially with each other. The input gear 34 and the large-diameter intermediate gear 35 mesh with each other to form a gear train G1 on the input side. The input gear 34 is a drive gear of the gear train G1 on the input side. The input gear 34 has a pitch circle diameter smaller than that of the large-diameter intermediate gear 35, and has the smaller number of teeth. Moreover, the small-diameter intermediate gear 36 and the output gear 37 mesh with each other to form a gear train G2 on the output side. The small-diameter intermediate gear 36 is a drive gear of the gear train G2 on the output side. The small-diameter intermediate gear 36 has a pitch circle diameter smaller than that of the output gear 37, and has the smaller number of teeth. The gear trains G1 and G2 each have a speed reduction ratio of equal to or larger than 2.5 and equal to or smaller than 7. Values of the speed reduction ratios of the gear trains G1 and G2 are set relatively close to each other. For example, a ratio of the speed reduction ratios of the gear trains G1 and G2 is set to equal to or larger than 0.5 and equal to or smaller than 2, preferably, equal to or larger than 0.8 and equal to or smaller than 1.2. Through intermediation of the gear trains G1 and G2 in two stages, a rotary motion of the motor rotation shaft 27 is reduced in speed with a predetermined speed reduction ratio.

The speed reducer input shaft $S_{in}$ is coaxially mounted to the motor rotation shaft 27 on the out-board side by spline fitting. The speed reducer input shaft $S_{in}$ is supported at its both ends by rolling bearings 45 and 46 on both sides of the input gear 34 in the axial direction. In the illustrated example, the in-board-side end portion of the speed reducer input shaft $S_{in}$ is supported on the housing 22 by the rolling bearing 45 so as to be freely rotatable, and the out-board-side end portion of the speed reducer input shaft $S_{in}$ is supported on the housing 22 by the rolling bearing 46 so as to be freely rotatable. The speed reducer input shaft $S_{in}$ may be formed integrally with the motor rotation shaft 27. In this case, any one of the bearing 33 configured to support the out-board-side end portion of the motor rotation shaft 27 and the bearing 45 configured to support the in-board-side end portion of the speed reducer input shaft $S_{in}$ may be omitted.

The intermediate shaft $S_m$ is supported at its in-board-side end portion on the housing 22 by a rolling bearing 47 so as to be freely rotatable, and is supported at its out-board-side end portion on the housing 22 by a rolling bearing 48 so as to be freely rotatable.

The speed reducer output shaft $S_{out}$ comprises a main body portion 51 and a connection portion 52. The main body portion 51 comprises the output gear 37. The connection portion 52 is provided integrally with the main body portion 51 on the out-board side. The speed reducer output shaft $S_{out}$ is supported on the housing 22 by rolling bearings 49 and 50 so as to be freely rotatable. In the illustrated example, both ends of the main body portion 51 of the speed reducer output shaft $S_{out}$ in the axial direction are supported by the rolling bearings 49 and 50. With this, the speed reducer output shaft $S_{out}$ which bears large torque can be supported with a sufficient bearing span while preventing interference of the rolling bearing 49 with the large-diameter intermediate gear 35, thereby being capable of obtaining high support rigidity.

In this embodiment, helical gears are used as the gears 34 to 37 forming the parallel shaft gear speed reducer 38. With the helical gears, the number of teeth which are simultaneously in mesh becomes larger, and teeth contact is dispersed. Therefore, the helical gears are effective in quietness and less torque fluctuation. In consideration of a meshing ratio and a limit rotation number of the gears, it is preferred that modules of the gears be set to from 1 to 3.

The bearing section C is formed of a wheel bearing 53 of an inner-ring rotation type. The wheel bearing 53 is a double-row angular contact ball bearing mainly comprising an outer ring 39, an inner member (rotation ring), a plurality of rolling elements 42, and a retainer. The outer ring 39 is fixed to the housing 22 and serves as an outer member (fixed ring). The inner member is arranged on an inner periphery of the outer ring 39. The plurality of rolling elements 42 are arranged between the inner member and the outer ring 39. The retainer is configured to retain the rolling elements 42. In the illustrated example, the inner member comprises a hub ring 40 and an inner ring 41 press-fitted to an outer periphery of the hub ring 40. A raceway surface is formed on an outer peripheral surface of each of the hub ring 40 and the inner ring 41. Double-row raceway surfaces are formed on an inner peripheral surface of the outer ring 39. The hub ring 40 integrally comprises a flange 40a. A brake rotor and a wheel are connected to the flange 40a by hub bolts.

The connection portion 52 of the speed reducer output shaft $S_{out}$ is connected to the rotation ring of the wheel bearing 53. In this embodiment, the connection portion 52 of the speed reducer output shaft $S_{out}$ is inserted along an inner periphery of the hub ring 40 of the wheel bearing 53 so that the connection portion 52 and the hub ring 40 of the wheel bearing 53 are connected to each other by spline fitting in a torque-transmittable manner. The fitting of the spline fitting portion connecting between the connection portion 52 of the speed reducer output shaft $S_{out}$ and the hub ring 40 of the wheel bearing 53 is in a state of clearance fitting in which a gap is defined between tooth surfaces opposed to each other and between tooth bottoms and tooth tops opposed to each other so that the hub ring 40 and the speed reducer output shaft $S_{out}$ are slightly movable relative to each other in the radial direction. With this, vibrations that each wheel receives from the ground are absorbed by the gap in the spline fitting portion, thereby being capable of suppressing vibrations received by the parallel shaft gear speed reducer 38 and the motor 28.

Grease is interposed between opposed tooth surfaces in the spline fitting portion of the connection portion 52 of the speed reducer output shaft $S_{out}$ and the hub ring 40 of the wheel bearing 53. For example, when the grease is applied to one or both of splines of the connection portion 52 of the speed reducer output shaft $S_{out}$ and the hub ring 40 and thereafter the connection portion 52 of the speed reducer output shaft $S_{out}$ is inserted along the inner periphery of the hub ring 40, the grease is interposed between the tooth surfaces in the spline fitting portion. Moreover, the grease is interposed also between the raceway surface of the outer ring 39 of the wheel bearing 53 and the rolling elements 42 and between the hub ring 40 or the raceway surface of the inner ring 41 and the rolling elements 42.

Meanwhile, lubricating oil is sealed inside the housing 22. At the time of drive of the in-wheel motor drive device 21, the lubricating oil in the housing 22 is pumped by an oil pump (for example, rotary pump) (not shown), and thus is fed to the bearings and gears. With this, the bearings and gears are cooled and lubricated. The space in which the lubricating oil is sealed and the space in which the grease is sealed, are partitioned by a sealing device (not shown) provided at the out-board-side end portion of the rolling bearing 50.

The in-wheel motor drive device 21 is accommodated inside the wheel housing 15 (see FIG. 6), and thus becomes unsprung load. Therefore, downsizing and reduction in weight thereof are required. Thus, through combination of the parallel shaft gear speed reducer 38 and the motor 28, the small-sized motor 28 with low torque and high-speed rotation can be used. For example, in a case in which the parallel shaft gear speed reducer 38 having a speed reduction ratio of 11 is used, the small-sized motor 28 with high-speed rotation of about ten and several thousand rotations per minute can be used. As described above, through downsizing of the motor 28, the compact in-wheel motor drive device 21 can be achieved. As a result, the unsprung weight is suppressed, thereby being capable of obtaining the electric vehicle 11 which is excellent in traveling stability and NVH characteristics.

Next, the characteristic configuration of the in-wheel motor drive device 21 according to this embodiment, in particular, arrangement of members forming the parallel shaft gear speed reducer 38 is described in detail with reference to FIG. 1 and FIG. 2. The reference symbol M given in FIG. 2 denotes a radially outer end of the wheel inner space.

Figure 2:
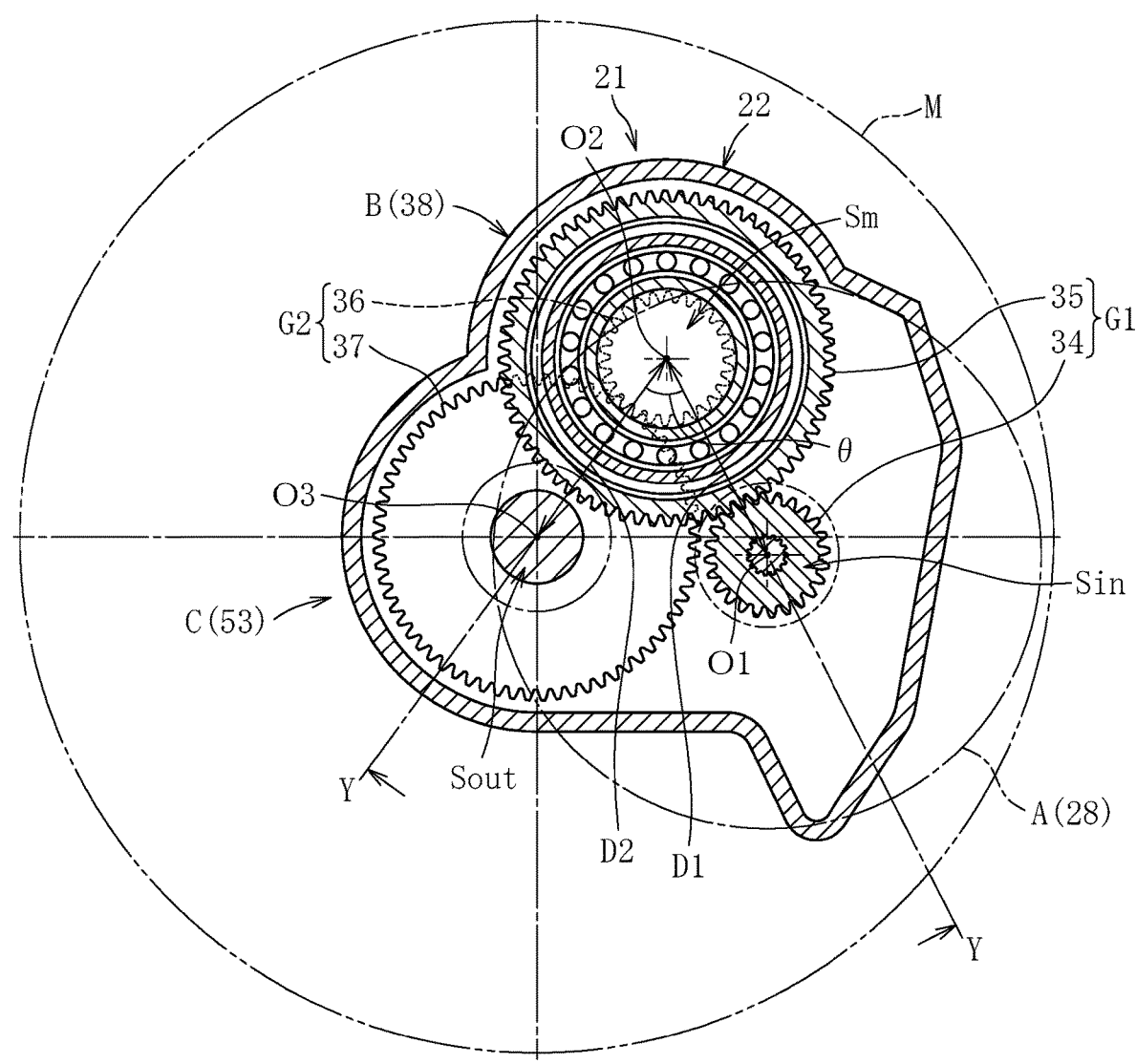
FIG. 2 is a sectional view of the in-wheel motor drive device described above, and is an illustration of a cross section taken along the line X-X of FIG. 1, when viewed in a direction indicated by the arrows (from in-board side).

As illustrated in FIG. 2, the in-wheel motor drive device 21 is accommodated in a radial region of the wheel inner space M. The speed reducer input shaft $S_{in}$ and the speed reducer output shaft $S_{out}$ of the parallel shaft gear speed reducer 38 are arranged with offset in the direction orthogonal to the axial direction. In the illustrated example, the speed reducer input shaft $S_{in}$, the intermediate shaft $S_m$, and the speed reducer output shaft $S_{out}$ are arranged so as to form a triangular shape when viewed from the axial direction. More specifically, the speed reducer output shaft $S_{out}$ and the speed reducer input shaft $S_{in}$ are provided at substantially the same height, and the intermediate shaft $S_m$ is provided above the speed reducer output shaft $S_{out}$ and the speed reducer input shaft $S_{in}$. As described above, when the speed reducer input shaft $S_{in}$ and the speed reducer output shaft $S_{out}$ are arranged with offset in the direction orthogonal to the axial direction, at least a part of the speed reducer input shaft $S_{in}$ in the axial direction can be arranged in an axial region of the speed reducer output shaft $S_{out}$ (see FIG. 1). In the illustrated example, the entire axial region of the speed reducer input shaft $S_{in}$ is arranged in the axial region of the speed reducer output shaft $S_{out}$. Through the superimposition of the axial regions of the speed reducer input shaft $S_{in}$ and the speed reducer output shaft $S_{out}$ as described above, an axial dimension of the in-wheel motor drive device 21 is reduced, and hence a projection amount of the in-wheel motor drive device 21 from the wheel inner space M toward the in-board side can be suppressed, thereby being capable of avoiding interference with the vehicle body and the suspension device.

Moreover, in the three-shaft two-stage parallel shaft gear speed reducer 38, the intermediate shaft $S_m$ comprising the large-diameter intermediate gear 35 and the small-diameter intermediate gear 36 is provided between the speed reducer input shaft $S_{in}$ and the speed reducer output shaft $S_{out}$. Therefore, the speed reduction ratio can be increased while suppressing a pitch circle diameter (outer diameter) of the output gear 37. In particular, in this embodiment, as illustrated in FIG. 1, the large-diameter intermediate gear 35 is increased in diameter to such a limit that a circumscribed circle (radially outermost portion) of the large-diameter intermediate gear 35 is superimposed with a pitch circle P of the rolling elements 42 of the wheel bearing 53, that is, a cylindrical plane passing through centers of the rolling elements 42 when viewed from the axial direction. With this, the speed reduction ratio of equal to or larger than 10 is achieved while suppressing the pitch circle diameter of the output gear 37.

As illustrated in FIG. 2, the speed reducer input shaft $S_{in}$ is arranged with offset with respect to a wheel center O3 to avoid the interference with the output gear 37. On this occasion, the pitch circle diameter of the output gear 37 is suppressed as described above, thereby being capable of suppressing an amount of offset of a center O1 of the motor 28 with respect to the wheel center O3. Thus, the motor 28 can easily be accommodated in the radial region of the wheel inner space M, including the stator 25 and the housing 22 retaining the stator 25.

A lower arm ball joint (not shown) configured to mount the in-wheel motor drive device 21 to the suspension device 16 is provided below the in-wheel motor drive device 21. In this embodiment, the pitch circle diameter of the output gear 37 is suppressed as described above. Therefore, a sufficient space for providing the lower arm ball joint can be secured below the output gear 37.

It is preferred that the speed reducer input shaft $S_{in}$ and the speed reducer output shaft $S_{out}$ be arranged as close as possible. In this embodiment, as illustrated in FIG. 2, an angle θ between a line connecting the center of the speed reducer input shaft $S_{in}$ (that is, center O1 of the motor) and a center O2 of the intermediate shaft $S_m$ and a line connecting the center of the speed reducer output shaft $S_{out}$ (that is, wheel center O3) and the center O2 of the intermediate shaft $S_m$ is equal to or smaller than 90°. In the illustrated example, a center distance D1 between the speed reducer input shaft $S_{in}$ and the intermediate shaft $S_m$ and a center distance D2 between the speed reducer output shaft $S_{out}$ and the intermediate shaft $S_m$ is substantially equal to each other, and a ratio between the center distance D1 and the center distance D2 falls within, for example, a range of from 0.8 to 1.2. With this, the speed reducer input shaft $S_{in}$, the intermediate shaft $S_m$, and the speed reducer output shaft $S_{out}$ are arranged in a compact manner to form a substantially isosceles triangle or a substantially equilateral triangle as in the illustrated example, when viewed in the axial direction. Therefore, the motor 28 can be more easily accommodated in the radial region of the wheel inner space M.

On this occasion, when the speed reducer input shaft $S_{in}$ and the speed reducer output shaft $S_{out}$ are arranged excessively close to each other, there is a fear in that the speed reducer input shaft $S_{in}$ and the output gear 37 interfere with each other. Thus, it is required that a distance between the center of the speed reducer input shaft $S_{in}$ (that is, the center O1 of the motor) and the center of the speed reducer output shaft $S_{out}$ (that is, the wheel center O3) at least be set larger than a sum of a radius of the circumscribed circle of the output gear 37 and a radius of the speed reducer input shaft $S_{in}$ in the axial region of the output gear 37 (radius of the cylindrical portion of the input gear 34 adjacent to the out-board side), and it is preferred that such distance be set larger than a sum of a radius of the circumscribed circle of the output gear 37 and a radius of the circumscribed circle of the input gear 34.

In the parallel shaft gear speed reducer 38 described above, as illustrated in FIG. 1, a sum of a radius R1 of the circumscribed circle of the large-diameter intermediate gear 35 and a radius R2 of an outer peripheral surface of a cylindrical portion 51a of the speed reducer output shaft $S_{out}$ adjacent to the output gear 37 on the in-board side is smaller than the center distance D2 between the intermediate shaft $S_{in}$ and the speed reducer output shaft $S_{out}$ (R1+R2<D2). With this, a radially outer end of the large-diameter intermediate gear 35 separates from the cylindrical portion 51a of the speed reducer output shaft $S_{out}$, and hence interference therebetween is avoided. In this embodiment, the pitch circle diameter of the large-diameter intermediate gear 35 is smaller than the pitch circle diameter of the output gear 37, and hence the dimensional relationship described above can easily be achieved. As long as the dimensional relationship described above can be achieved, the pitch circle diameter of the large-diameter intermediate gear 35 may be equal to or larger than the pitch circle diameter of the output gear 37.

In this embodiment, a recess portion 35a having an annular shape is formed in an end surface of the large-diameter intermediate gear 35 on the in-board side, and at least a part of the axial region (in the illustrated example, the entirety of the axial region) of the rolling bearing 47 is accommodated in the recess portion 35a. Moreover, a recess portion 37a is formed in an end surface of the output gear 37 on the out-board side, and at least a part of the axial region (in the illustrated example, the entirety of the axial region) of the rolling bearing 50 is accommodated in the recess portion 37a. As described above, when the gears 35 and 37 and the bearings 47 and 50 configured to support the gears 35 and 37 are arranged so as to be superimposed with each other in the direction orthogonal to the axial direction, the axial dimension of the parallel shaft gear speed reducer 38 and the axial dimension of the in-wheel motor drive device 21 can be reduced.

Figure 3:
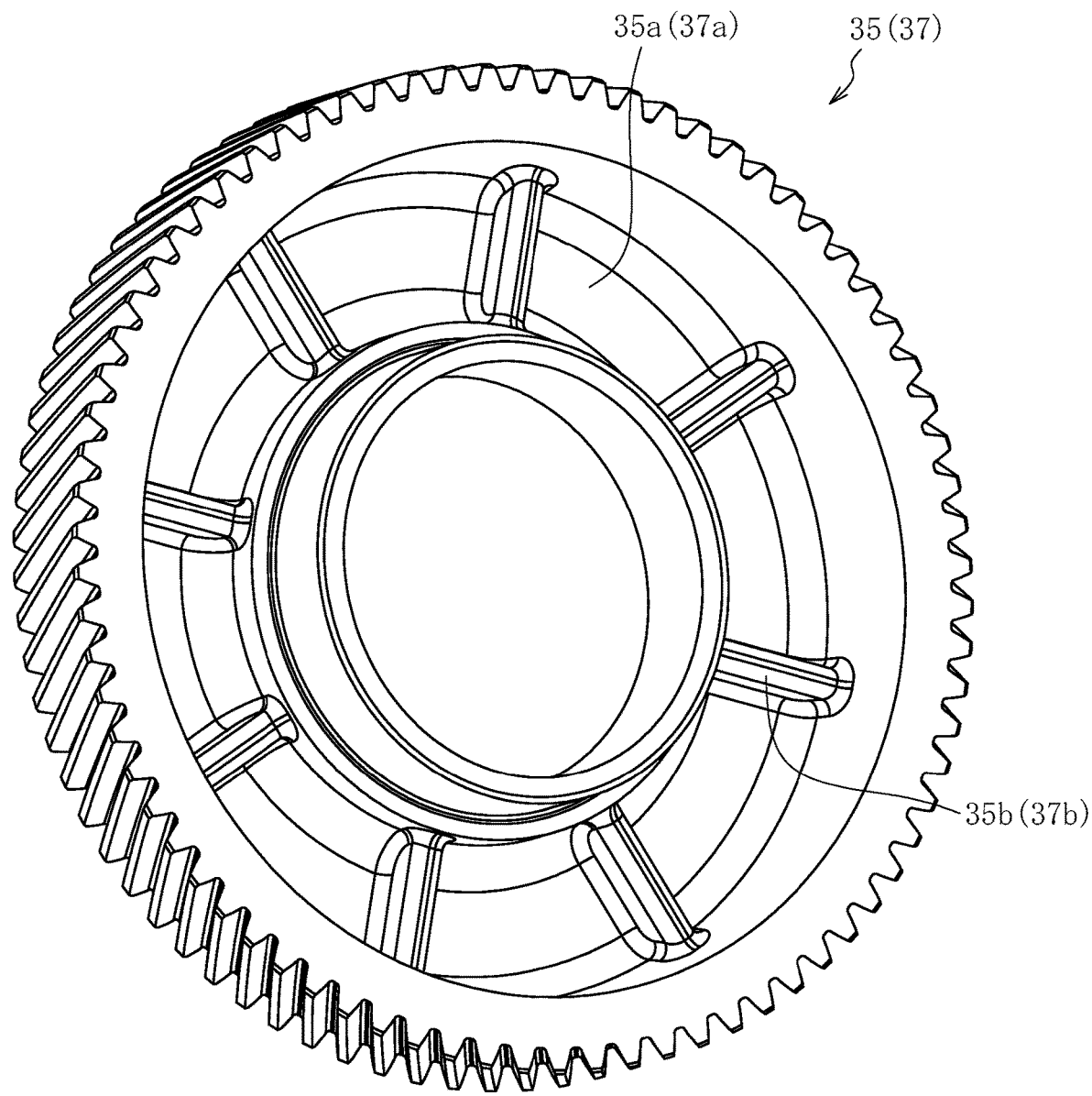
FIG. 3 is a perspective view for illustrating another example of a large-diameter intermediate gear.

As described above, when the recess portions 35a and 37a are formed in the end surfaces of the large-diameter intermediate gear 35 and the output gear 37, as illustrated in FIG. 3, ribs 35b and 37b may be provided in the recess portions 35a and 37a. In the example illustrated in FIG. 3, a plurality of ribs 35b and 37b extending in the radial direction are provided in a radial arrangement in the recess portions 35a and 37a of the end surfaces of the first intermediate gear 35 and the output gear 37. With this configuration, the strength of the first intermediate gear 35 and the output gear 37 is enhanced. In this case, the rolling bearings 47 and 50 are arranged at positions not interfering with the ribs 35b and 37b.

Figure 4:
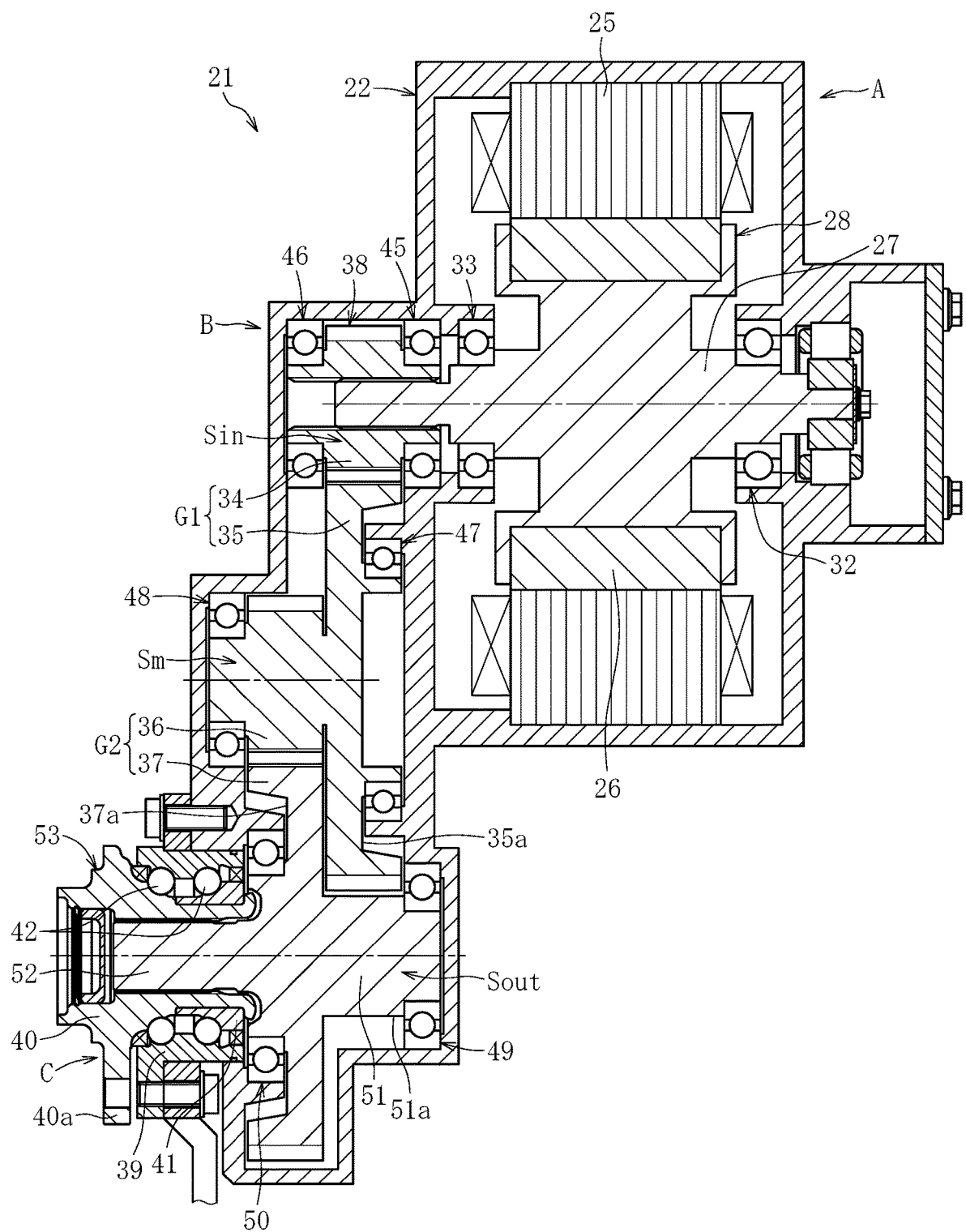
FIG. 4 is a sectional view of an in-wheel motor drive device according to another embodiment of the present invention.

The present invention is not limited to the embodiment described above. For example, as illustrated in FIG. 4, the bearing 46 configured to support the out-board-side end portion of the speed reducer input shaft $S_{in}$ may be arranged on the in-board side with respect to the bearing 48 configured to support the out-board-side endportion of the intermediate shaft $S_m$. In the illustrated example, the entirety of the axial region of the bearing 46 configured to support the out-board-side end portion of the speed reducer input shaft $S_{in}$ is arranged in the axial region of the gear train G2 on the output side. With this configuration, the axial length of the speed reducer input shaft $S_{in}$ can be reduced, thereby being capable of achieving reduction in weight of the speed reducer input shaft $S_{in}$ and reduction in cost.

In the embodiment described above, description is made of the case in which the wheel bearing 53 is of the inner-ring rotation type. However, the present invention is not limited to this. A wheel bearing of an outer-ring rotation type may be used. In this case, the inner ring is a fixed ring fixed to the housing 22, and the outer ring is a rotation ring configured to rotate with respect to the inner ring. The hollow speed reducer output shaft is coupled to the outer peripheral surface of the outer ring by spline fitting in a torque-transmittable manner. The brake rotor and the rear wheel are connected to the flange provided to the outer ring.

Moreover, in the embodiment described above, illustration is given of the motor 28 of the radial gap type as the drive section A. However, a motor having a freely selected configuration can be applied. For example, a motor of an axial gap type in which the stator and the rotor are opposed to each other through a gap in the axial direction may be adopted.

Moreover, in the embodiment described above, as illustrated in FIG. Sand FIG. 6, illustration is given of the electric vehicle 11 comprising the rear wheels 14 as driving wheels. However, the electric vehicle 11 may comprise the front wheels 13 as driving wheels, or may be a four-wheel drive vehicle. In Description, the "electric vehicle" encompasses all automobiles which obtain driving force from electric power, and may include, for example, a hybrid car.

Moreover, in the embodiment described above, description is made of the in-wheel motor drive device comprising the three-shaft two-stage parallel shaft gear speed reducer. However, the present invention is not limited to this, and may be applied to an in-wheel motor drive device comprising a parallel shaft gear speed reducer comprising the larger number of shafts and gear trains (for example, four-shaft three-stage parallel shaft gear speed reducer).

The present invention is not limited to the above-mentioned embodiment. As a matter of course, the present invention may be carried out in various modes without departing from the gist of the present invention. The scope of the present invention is defined in the scope of claims, and encompasses equivalents described in claims and all changes within the scope of claims.

REFERENCE SIGNS LIST 21 in-wheel motor drive device
22 housing
27 motor rotation shaft
28 motor
34 input gear
35 large-diameter intermediate gear
36 small-diameter intermediate gear
37 output gear
38 parallel shaft gear speed reducer
39 outer ring
40 hub ring
41 inner ring
53 wheel bearing
A drive section
B speed reduction section C bearing section
$S_{in}$ speed reducer input shaft
$S_m$ intermediate shaft
$S_{out}$ speed reducer output shaft
G1 gear train on input side
G2 gear train on output side
M wheel inner space
O1 center of motor (center of speed reducer input gear)
O2 center of intermediate shaft
O3 center of wheel (center of speed reducer output gear)

The invention claimed is:

1. An in-wheel motor drive device, comprising:
a motor;
a wheel bearing comprising a fixed ring, a rotation ring, and a plurality of rolling elements arranged between the fixed ring and the rotation ring; and
a speed reducer configured to connect the motor and the wheel bearing to each other, the speed reducer being formed of a parallel shaft gear speed reducer comprising:
    a speed reducer input shaft, which is configured to rotate integrally with a rotation shaft of the motor, and comprises an input gear;
    a speed reducer output shaft, which is configured to rotate integrally with the rotation ring of the wheel bearing, and comprises an output gear; and
    an intermediate shaft comprising:
        a small-diameter intermediate gear configured to mesh with the output gear; and
        a large-diameter intermediate gear provided coaxially with the small-diameter intermediate gear,
wherein a speed reduction ratio of the speed reducer is constant,
wherein the large-diameter intermediate gear has a circumscribed circle which is superimposed with a pitch circle of the plurality of rolling elements of the wheel bearing when viewed from an axial direction, and
wherein the speed reducer input shaft, the intermediate shaft, and the speed reducer output shaft are arranged to form a triangular shape when viewed from the axial direction.

2. The in-wheel motor drive device according to claim 1, wherein the speed reducer comprises gear trains each formed of gears in mesh with each other, and the gear trains each have a speed reduction ratio of equal to or larger than 2.5 and equal to or smaller than 7.

3. The in-wheel motor drive device according to claim 1, wherein the large-diameter intermediate gear has a pitch circle diameter which is smaller than a pitch circle diameter of the output gear.

4. The in-wheel motor drive device according to claim 1, wherein the speed reducer is formed of a three-shaft two-stage parallel shaft gear speed reducer comprising the large-diameter intermediate gear and the input gear in mesh with each other.

5. The in-wheel motor drive device according to claim 4, wherein an angle formed between a line connecting a center of the speed reducer input shaft and a center of the intermediate shaft and a line connecting a center of the speed reducer output shaft and the center of the intermediate shaft is equal to or smaller than 90°.

6. The in-wheel motor drive device according to claim 1, wherein the wheel bearing is an inner-ring rotation wheel bearing.

7. The in-wheel motor drive device according to claim 1, wherein the in-wheel motor drive device is fully accommodated in a radial region of a wheel inner space.

8. The in-wheel motor drive device according to claim 1,
wherein the rotation ring of the wheel bearing comprises a hub ring integrally having a flange configured to connect to a wheel, and
wherein the speed reducer output shaft is inserted along an inner periphery of the hub ring of the wheel bearing and connected to the hub ring in a torque transmittable manner.

* * * * *